United States Patent [19]

Raniero

[11] Patent Number: 5,059,160
[45] Date of Patent: Oct. 22, 1991

[54] SELF-LOCKING DIFFERENTIAL GEAR

[75] Inventor: Antonietto Raniero, Padova, Italy

[73] Assignee: Carraro S.p.A., Italy

[21] Appl. No.: 430,407

[22] Filed: Nov. 2, 1989

[30] Foreign Application Priority Data

Nov. 2, 1988 [IT]  Italy ................ 22484 A/88

[51] Int. Cl.⁵ ............................................. E16H 1/45
[52] U.S. Cl. ..................................... 475/234; 475/231; 192/93 A
[58] Field of Search ............... 475/223, 226, 230, 231, 475/232, 234, 236, 238, 239, 243, 241, 242, 240; 192/93

[56] References Cited

U.S. PATENT DOCUMENTS

| | | | |
|---|---|---|---|
| 3,012,449 | 12/1961 | Stockwell | 475/243 |
| 3,330,169 | 7/1967 | Carrico et al. | 475/231 X |
| 3,397,595 | 8/1968 | Roach | 475/234 |
| 3,438,282 | 4/1969 | Thornton | 475/234 |
| 3,512,430 | 5/1970 | Sutherland | 475/243 |
| 3,546,968 | 12/1970 | Altmann | 475/240 |
| 4,719,817 | 1/1988 | Azuma | 475/239 X |
| 4,860,869 | 8/1989 | Hall, III | 192/93 A |

FOREIGN PATENT DOCUMENTS 138565  2/1920 United Kingdom.

Primary Examiner—Allan D. Herrmann
Assistant Examiner—Khoi Q. Ta
Attorney, Agent, or Firm—Sughrue, Mion, Zinn, Macpeak & Seas

[57] ABSTRACT

A self-locking differential gear includes a gear carrier on which two crown wheels are journalled and a clutch disposed between each crown wheel and the gear carrier to selectively render a corresponding axle shaft rotatable with the gear carrier. Each crown wheel is comprised of a ring wheel rotatable with an axle shaft and a ring gear in meshing engagement with the plant gears. A clutch operating device includes first and second engagement members shiftable angularly relative to each other and being respectively rotatable with the ring gear and the corresponding axle shaft. The engagement members are operative to engage a corresponding clutch when shifted angularly with respect to each other in at least one of the two directions of rotation of the corresponding axle shaft, thereby providing for an effective locking of the differential gear even on the occurrence of a significant difference in the torque being transferred from each axle shaft.

9 Claims, 3 Drawing Sheets

SELF-LOCKING DIFFERENTIAL GEAR

BACKGROUND OF THE INVENTION

DESCRIPTION

This invention relates to a self-locking differential gear comprising:

a gear carrier whereon two crown wheels, each including a ring gear enmeshed with planet gears and an internally splined ring wheel with a respective axle shaft rotation-wise, are supported rotatably, a friction clutch intervening between each crown wheel and said gear carrier to make the corresponding axle shaft unitary rotation-wise with said gear carrier, and a device for engaging a corresponding clutch intervening between each clutch and the ring gear of the corresponding crown wheel, said device including first and second engagement members which are shiftable angularly relative to each other and respectively unitary rotation-wise with the ring rear and the corresponding axle shaft.

A differential gear of this kind is known from Patent GB-A-138,565.

In conventional self-locking differential gears, in particular for use on the front drive axle of four-wheel drive agricultural tractors, the crown wheels are mounted free to slide axially a short distance on the corresponding axle shaft to activate their respective clutches by compressing a corresponding set of friction plates each time that torque is transmitted from the differential gear to the axle shafts.

The axial sliding movement and consequent compression of the friction plates, which tends to drive the axle shaft at the same rotational speed as the gear carrier, is effected by the component of the thrust on the sides of the enmeshed teeth between the crown wheels and planet gears, along the axial direction of the axle shaft. In order for this axial thrust to develop in such a way as to successfully lock the differential gear, a sufficient resisting torque is to be applied to both axle shafts. This torque is due to the tractor resistance to motion and the resistance to rolling developed between the front drive wheels of the tractor and the ground on which they are acting.

However, when either of the two front drive wheels meets a condition of very poor traction, such as on mud, snow, ice, etc., it may occur that the resisting torque which opposes the driving torque induced on an axle shaft by the differential gear becomes so low as to apply an insufficient axial thrust to the sides of the enmeshed teeth between the crown wheels and the planet gears to produce an effective compression of the friction plates. In this case, that wheel which is under a condition of poor traction will begin to slip, thereby the differential gear locking action is lost.

A similar condition is likely to occur where one of the wheels, for example, is raised off the ground by upward bumps of the ground surface.

To partly obviate such shortcomings, UK Patent No. 138,565 suggests of increasing the clutch plate compression while running, with the provision of ramp devices intervening between the clutch and a ring gear on each crown wheel. With the proposed construction, the ramp devices produce an axial compression of the clutch plates, while torque is being transferred to the axle shaft, in either directions of rotation of the same and, therefore, either travel directions of a vehicle equipped with such a differential gear.

Thus, in essence, each time there occurs transfer of torque, whether driving or consisting torque, between an axle shaft and the corresponding crown wheel, the clutch plates will be equally compressed, thus tending to hold back each axle shaft with respect to the gear carrier.

In order for this not to hinder the differential splitting of the motion on turning, it is therefore necessary that the braking ability of the clutch plates or the axial thrust developed by the ramp devices be limited, and be limited, accordingly, the differential locking effectiveness. This drawback is enchanced where the differential is mounted on the front, driving and steering, axle of an FWD vehicle. Due, in fact, to the front wheels travelling, in the steered condition, a path with a larger average radius than that travelled by the rear wheels, they tend to slow down the vechicle with respect to the travel speed imposed by the rear wheels. This problem is obviated customarily by so splitting the transfer of motion as to have the tanqent velocity of the front wheels slightly higher, in straight-line running, than that of the rear wheels; however, as the steering angle is increased, that difference in velocity reduces itself down to negative values on tight cornering. In this case, the differential gear of UK Patent 138,565 would tend to become locked and hinder, if not altogether block, the steering action.

SUMMARY OF THE INVENTION

The problem that underlies this invention is to provide a self-locking differential gear adapted to be incorporated to one or both axles of a FWD vehicle, whose structure enables proper operation even in the presence of great differences in the resisting torque opposed to the two axle shafts in at least one of the directions of travel, thereby obviating all of the drawbacks with which the cited prior art is beset.

This problem is solved according to the invention by a self-locking differential gear of the kind specified above being characterized in that said engagement members are effective to engage a corresponding clutch when shifted angularly relative to each other in one of the two directions of rotation of the corresponding axle shaft.

BRIEF DESCRIPTION OF DRAWINGS

The features and advantages of the invention will be more clearly apparent from the following detailed description of a preferred but not exclusive embodiment thereof shown, by way of example and not of limitation, in the accompanying drawings, where.

DETAILED DESCRIPTION OF THE DRAWINGS

Figure 1:
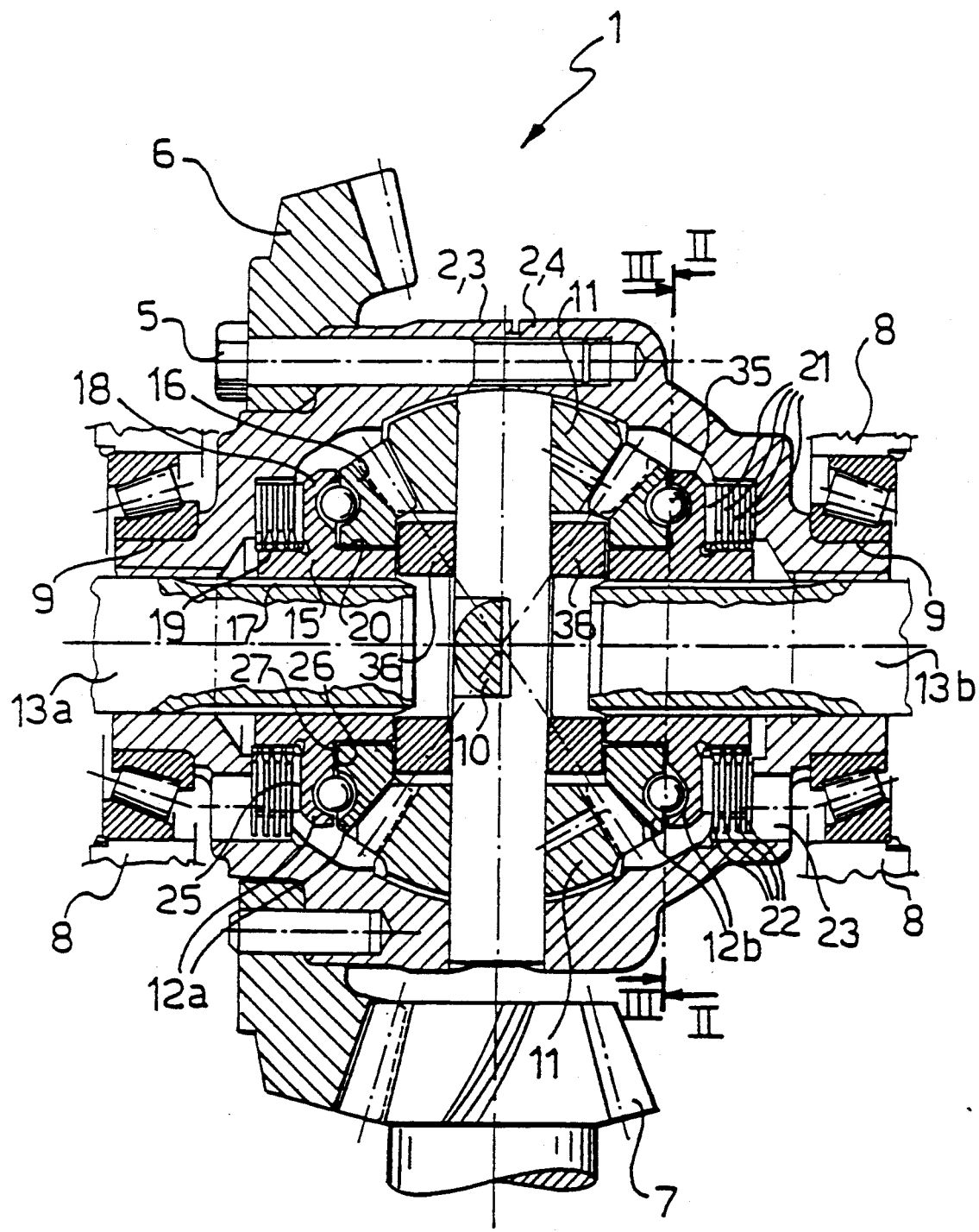
FIG. 1 is a sectional view through a self-locking differential gear for front drive axles of agricultural tractors embodying this invention.
Figure 3:
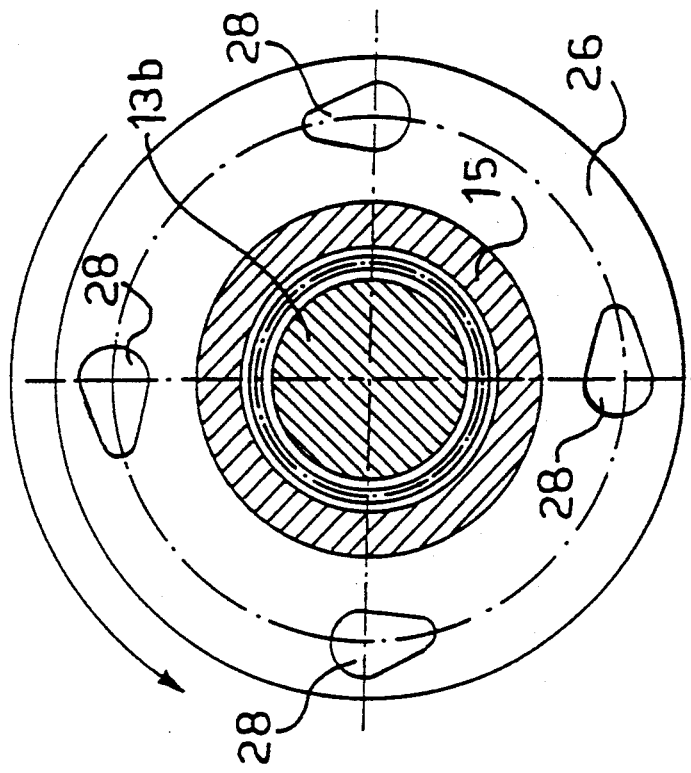
FIGS. 2 and 3 are sectional detail views taken along the lines II—II and III—III in FIG. 1.
Figure 4:
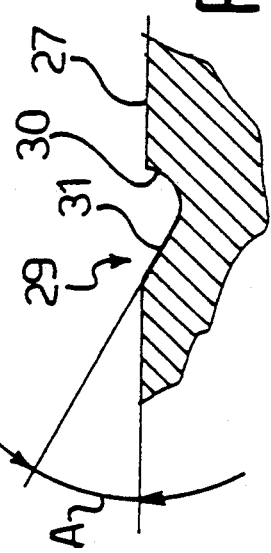
FIG. 4 is a sectional detail view of the same differential gear, taken along the line IV—IV in FIG. 2.
Figure 2:
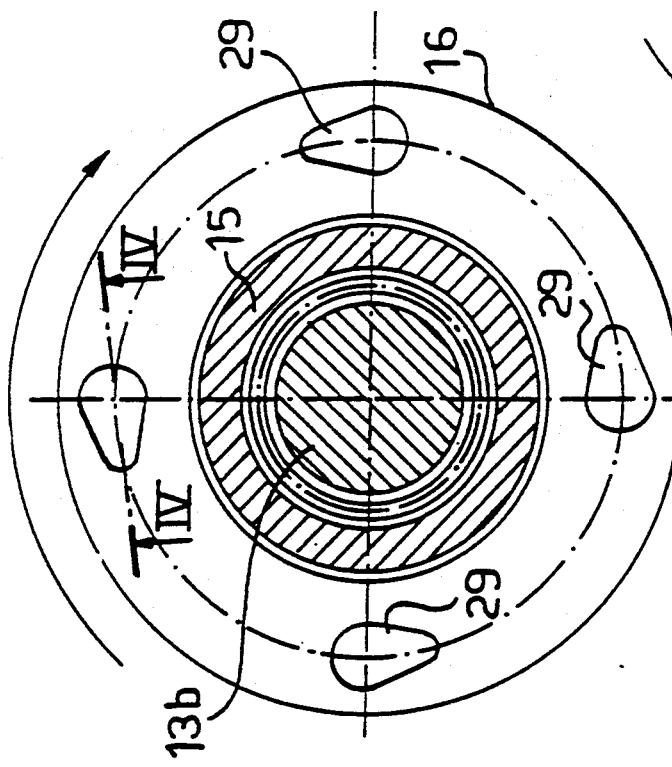

As shown in FIGS. 1 to 4 of the drawings, a differential gear 1 comprises a gear carrier or gear 2 formed of two halves 3, 4 which are a male-female fit and made unitary with each other by screws 5. The screws 5 also secure a conical toothed wheel 6 to the case 2. The case 2 is supported rotatably, as by means of taper roller bearings 9, within a front axle 8, only partly shown, of an agricultural tractor.

The ring gear 6 receives its motion through a bevel pinion gear 7 with which it is in mesh engagement.

Supported in the case 2 are two journals 10 arranged in a cross-like configuration and each carrying a pair of planet gears 11 for idle rotation therearound. Said planet gears 11 enmesh with a pair of crown wheels generally indicated at 12a and 12d, respectively.

The crown wheels 12a, b are made, in turn, unitary rotation-wise with respective axle shafts 13a, b each connected to one wheel (not shown) of the front axle.

Each crown wheel has an internally splined ring wheel 15 and a ring gear 16 which are structurally independent of each other. The ring wheel 15 has a splined central bore 17 in sliding engagement with a splined end of the corresponding axle shaft 13a, b, and a radial outboard flange 18 provided at an intermediate location between an outside splined section 19 and a cylindrical outer section 20.

Spline keyed on the splined section 19 are a series of friction plates 21 alternating with clutch plates 22. The latter are each made unitary rotation-wise with the case 2 by four radial projections fitting into four radial grooves 23 which are formed in each case half 3, 4.

The clutch plate assembly 21, 22 forms a friction clutch adapted to make the axle shaft 13a, b with which it is associated unitary rotation-wise with the case 2.

With reference to FIGS. 1 to 4, defined on the flange 18 are two opposing flat surfaces 25, 26; the former lying close against the clutch plate assembly 21, 22 and the latter facing a corresponding flat surface 27 on the ring gear 16, with said gear 16 fitted rotatably over the cylindrical section 20.

Each of the surfaces 26, 27 is formed with a corresponding series of notches, respectively indicated at 28 and 29.

All the notches 28, 29 have a teardrop shape in plan view and a sawtooth shape in section along a middle circumferential line, thereby a breast 30 and back or bottom 31 are defined which lie at an angle A to the plane of the corresponding surface 26, 27. Said angle A varies between 30° and 80°, preferably between 45° and 75°.

The notches 28 located on the surface 26 are so oriented as to have the tapering end of the teardrop shape concurrent with the direction of rotation of its respective axle shaft 13a, b, with the tractor driven in forward gear, whereas the notches 29 on the surface 27 are oriented in the opposite direction. The direction of rotation in forward gear is indicated by arrows in FIG. 2 and 3.

A ball 35 is accommodated between each pair of corresponding notches 28, 29.

A shimming ring 36 provides shim adjustment at the free end of each axle shaft 13a, crown wheel 12a, b, and ring wheel 15 to maintain a predetermined amount of backlash between said crown wheels 12a, b and the planet gears 11 irrespective of the axial load to which the wheels 12a, b may be subjected.

The differential gear 1 operates as follows.

The conical toothed gear 6 receives its motion through the bevel pinion gear 7 and entrains the case or carrier 2 rotatively on the bearings 9.

The rotary motion is then transferred, via the planet gears 11 to the crown wheels 12a, b, and via the axle shafts 13a, b to the front road wheels of the tractor.

Under a condition of straight travel in forward gear, the ring gear 16 of each crown wheel 13a, b will be shifted angularly with respect to the corresponding ring wheel 15 by the action of the oppositely-acting driving and resisting torques respectively induced on the axle shaft by the crown wheels and the wheel rolling resistance. The angular displacement takes place along a direction in which the breasts 30 of the facing notches 28, 29 tend to be moved farthest apart.

Accordingly, the balls 35 will be forced to climb up the backs or bottoms 31 of the corresponding notches 28, 29 and cause the ring wheel 15 to move axially away from its corresponding ring gear 16 and the clutch plate assembly 21, 22 to become compressed and lock each axle shaft relatively to the carrier or case 2.

Due to the sloping bottom of back 31 of the notches 28, 29, the axial component of the thrusts generated by the displacement of the balls 35 is significant even under a small resisting torque. It has been observed that the inertia of the road wheel is alone sufficient to generate a resisting torque effective to cause the differential gear to be locked. The ramp-like bottom of the notches 28, 29, owing to the balls 35 provided, behaves therefore respectively as a first (notches 28) and second (notches 29) clutch engaging-member of an engaging device for the corresponding clutch.

The shimming rings 36 oppose any axial movements of the crown wheels 12a, b toward the ring wheel 15, thus providing for proper enmeshing with the planet gears 11.

When travelling a curving path in forward gear, the outboard road wheel will cover a longer distance than the inboard wheel.

Accordingly, the axle shaft associated with the outboard wheel, e.g. 13a, will be driven at a higher rotational speed than the axle shaft 13b associated with the inboard wheel.

As a result, the ring wheel 15 connected to the axle shaft 13a will be rotated, relatively to its corresponding ring gear 16, in a direction tending to bring the breasts 30 of the corresponding notches 28, 29 closer together. The balls 35 are therefore caused to roll down the ramps of the backs or bottoms 31 toward the corresponding breast 30, thereby allowing for an axial approaching movement between the ring wheel 15 and the ring gear 16 and unloading the clutch plate assembly 21, 22 and, consequently, unlocking the differential gear.

Owing to the axle shaft 13a being released relatively to the rotational speed of the carrier 2, there also occurs partial unloading of the clutch associated with the axle shaft 13b, thereby making for more favorable steering condition.

In reverse gear movement, the differential gear 1 will operate the same way as a conventional self-locking differential gear because the orientation of the notches 28, 29 prevents the balls 35 from compressing the clutch plate assemblies 21, 22 of the respective clutches in reverse gear.

Thus, the compression of the clutch plate assemblies 21, 22 will take place on account of the axial component of the thrust generated at the sides of the enmeshed teeth between the crown wheels 12a, b and the planet gears 11.

Figure 5:
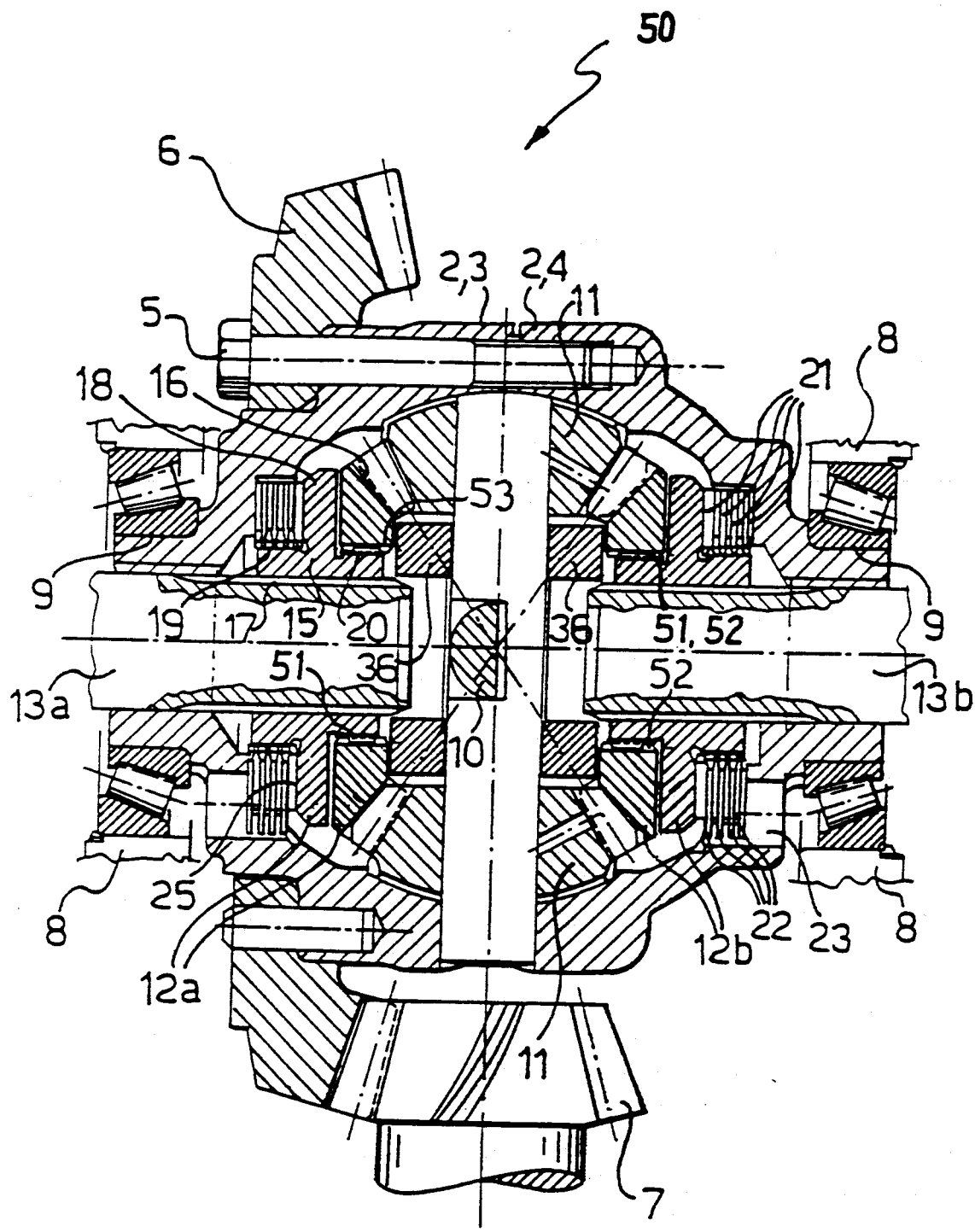
FIG. 5 is a sectional view of a modified embodiment of the differential gear according to the invention.

FIG. 5 shows a modified embodiment, generally indicated at 50, of the differential gear according to this invention.

Similar parts have been identified with the same reference numerals as in the preceding figures.

The differential gear 50 differs from the above-described example mainly by the configuration of the elements which control the engagement of each clutch in either direction of travel. The cylindrical outer section 20 of the spigot 15 is formed with threads 51 which engage threadably in threadways 52 formed within an axial bore 43 in the ring gear 16. This is effective to produce an axial displacement of the ring wheel 15 relatively to the ring gear 16 to thereby compress the clutch plate assembly 21, 22 in an equivalent fashion of the action of the balls 35 into the notches 28, 29 of the previous embodiment. On the other hand, when one of the axle shafts, e.g. the axle shaft associated with the outboard wheel on turning, is being entrained by its respective wheel, or when operating in reverse, the threaded section of the ring wheel 15 will thread itself in, through the bore 53, to bring the surfaces 26, 27 into contact and, accordingly, release the corresponding clutch.

The major advantage of the inventive differential gear is that is provides, in addition to a conventional locking action in either travel directions of the tractor, an improved locking action at least while driving in forward gear, thereby a prompt differential gear locking effect is ensured even with the wheels of any one axle encountering definitely different traction conditions.

We claim:

1. A self-locking differential gear comprising:
   a housing,
   a gear carrier mounted for rotation in the housing,
   a plurality of planet gears rotatably supported by the gear carrier,
   a pair of aligned axle shafts mounted for rotation on the carrier gear,
   a pair of crown wheels each including a ring gear enmeshed with the planet gears and an internally splined ring wheel mounted on a splined end of a respective axle shaft, the ring gear being mounted for rotation on the ring wheel,
   a friction clutch disposed between each ring wheel and said gear carrier to connect for rotation the corresponding axle shaft with the gear carrier,
   opposite facing ramp means intervening between each ring gear and the corresponding ring wheel, said ramp means including first and second engagement means which are shiftable angularly relative to each other and which are operatively connected for rotation with ring gear and with the corresponding ring wheel, respectively, wherein said engagement means are effective to engage the respective clutch when shifted angularly relative to each other in only one of the two directions of rotation of the corresponding axle shaft.

2. A differential gear according to claim 1, wherein said engagement means are arranged to generate, upon being shifted angularly relative to each other in said direction of rotation, a relative axial displacement between the ring wheel and the ring gear and engagement of the corresponding clutch.

3. A differential gear according to claim 2, wherein said engagement means comprises respective notches having a sloping bottom located on respective confronting surfaces of the ring wheel and the ring gear and a ball received between corresponding notches in each member.

4. A differential gear according to claim 3, wherein the inclination angle of the sloping bottom of said notches is within the range of 30° to 80°.

5. A differential gear according to claim 4, wherein the inclination angle of the sloping bottom of said notches is within the range of 45° to 75°.

6. A diffferential gear according to claim 2, wherein said ramp means comprise respective threads in mutual engagement.

7. A differential gear according to claim 6, wherein one of said threads is formed in an axial bore of said ring gear and the other of said threads is formed on a cylindrical section of said ring wheel adapted for engagement in said axial bore.

8. A differential gear according to claim 1, wherein said ring gear and internally splined ring wheel of each crown wheel are structurally independent of each other and said first and second engagement means are formed on confronting surfaces of the ring gear and the ring wheel, respectively.

9. A differential gear according to claim 1, further comprising a spacer located between each crown wheel and the corresponding planet gears to maintain a predetermined amount of backlash therebetween.

* * * * *